March 12, 1968  S. EPSTEIN ET AL  3,373,400
DETERMINATION OF GEOPHYSICAL PROPERTIES OF THE SEA BOTTOM
Filed Oct. 14, 1965
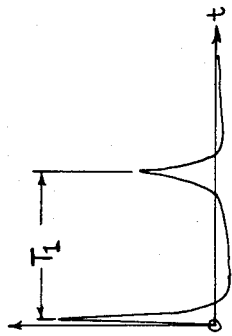
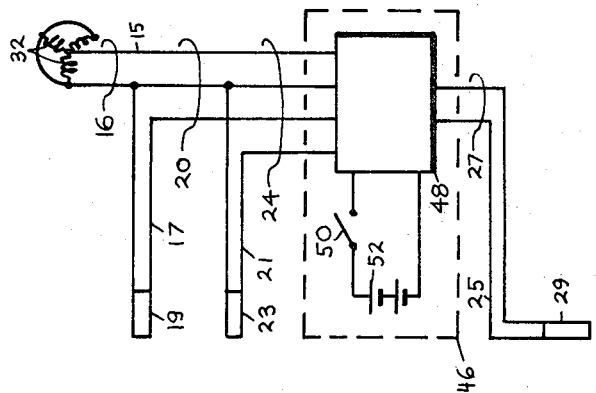
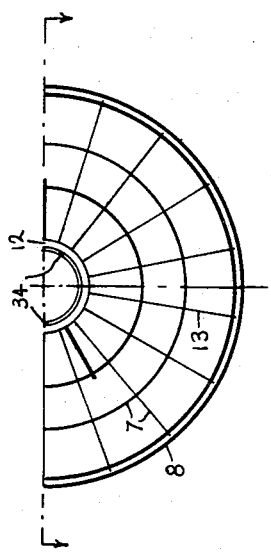
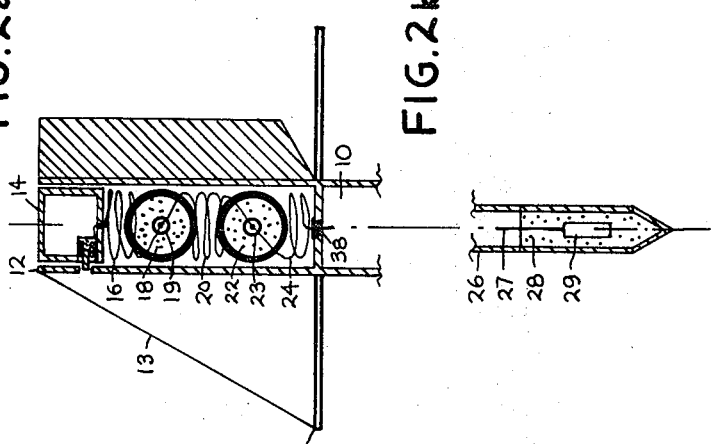
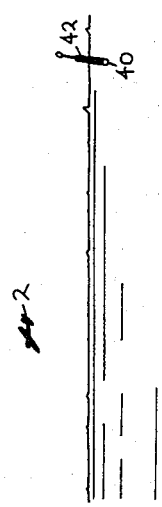
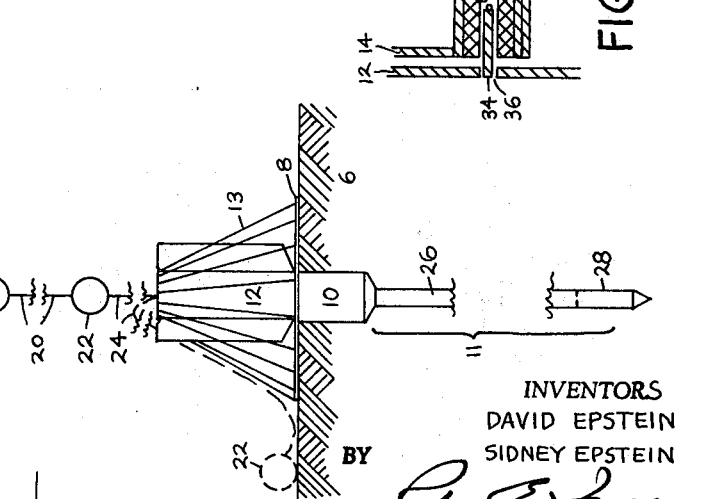
INVENTORS
DAVID EPSTEIN
SIDNEY EPSTEIN
BY 
ATTORNEY

United States Patent Office 3,373,400
Patented Mar. 12, 1968

3,373,400
DETERMINATION OF GEOPHYSICAL PROPERTIES OF THE SEA BOTTOM
Sidney Epstein and David Epstein, Brooklyn, N.Y., assignors to Vadys Associates, Ltd., Brooklyn, N.Y., a corporation of New York
Filed Oct. 14, 1965, Ser. No. 495,822
6 Claims. (Cl. 340—7)

This invention relates to an apparatus and process for carrying out in situ measurements of geophysical properties of the ocean bottom from an aircraft or surface vessel.

Measurements of the geophysical properties of the ocean bottom, such as permeability, porosity, grain size of sedimentary particles and sound velocity are difficult to obtain. Two of the commonest prior art methods of obtaining information concerning the physical properties of the ocean bottom are:

(a) Refraction "shooting" and/or so-called reflection profiling methods wherein sonic energy is introduced into the sea bottom from transducers located within the sea; and wherein many geophysical properties may be deduced from recordings of the returned signal energy; and (b) "Coring" wherein sample cores of the bottom are brought to the surface for laboratory analysis.

The subject invention departs from the prior art technique in that it provides information from which the sediment properties are deducible from the hydrodynamical or flow behavior of the sediment rather than from the acoustic or compression wave behavior thereof. In more particularity, the subject invention provides information relative to the modification of an explosion waveform effected by the interaction between the sediment and the motion or flow of the water resulting from the expansion of the gas bubble, and such serves to reveal the properties of the sediment in the immediate vicinity of the explosion. Thus, unlike prior art seismic methods, which, for example, serve to measure average properties of thick sedimentary layers over long range, the characteristics determinable by the new method are directly related to the local sediments confined to a small region near the center of the explosion.

It is an object of this invention to provide an in situ method of effecting progressive detonation or explosion at predetermined time intervals and at predetermined locations relative to the sea bottom to provide selectively varying bubble pulse characteristics indicative of the surrounding environment.

Another object of the present invention is to provide a novel sediment probe instrument apparatus to facilitate the above-mentioned in situ method of effecting progressive detonation or explosion at predetermined time intervals and at predetermined locations relative to the sediment layers of the sea bottom.

One advantageous feature of the subject invention is the provision of a novel and convenient method for obtaining a survey of the geophysical properties at the ocean bottom of a given body of water by dropping a multiplicity of the herein described sediment probe instrument packages at known locations in said body of water and timing their sequential detonations so that the signal returns from each location is readily ascertained. Since the instrument package laying vehicle may be either sea or airborne, the signal retrieval and relaying techniques, which form no part of this invention and are well known to practitioners of the art, must be tailored to the vehicles used. Some suitable techniques for signal retrieval are described by J. O. Morin and R. G. Walden, in "Radio Telemetering Bouys," Undersea Technology 4 No. 8 15 (1963) while others could conventionally utilize hydrophones attached to sea borne vehicles or suspended from helicopters.

Other objects and features of the invention as well as a more detailed explanation and disclosure thereof may be obtained by referring to the following portions of this specification and drawings which disclose a presently preferred embodiment incorporating the principle of the invention.

Referring to the drawings:

FIG. 1 diagrammatically illustrates the essential components of the presently preferred embodiment of the invention as disposed in situ on the ocean bottom and prepared to "fire."

FIG. 2a is a plan view of the sediment probe instrument package illustrated in FIGURE 2b.

FIG. 2b is a schematic view partially in cross section illustrating a method of packaging the float and associated charges in the tail section of the sediment probe instrument package.

FIG. 3 is an expanded fragmentary cross sectional view of the float release mechanism.

FIG. 4 is a schematic circuit diagram showing suitable detonation and timing circuits.

FIG. 5 is an illustrative pressure vs. time plot of a deep-fired explosive shock wave and first bubble-pulse.

In the surveying of the geophysical properties of the bottom of a given area of ocean by utilization of the principles of this invention, a suitable vehicle such as an airplane 2 is adapted to drop a plurality of sediment probe instrument packages 4 at predetermined locations. As will be apparent from the drawings and from what hereinafter follows the probe instrument package 4 is designed to fall rapidly through the air and water regimes and to drive deep into the sediment 6 in nose down position, as shown in FIG. 1. The probe's rate of downward motion and its depth of penetration into the sediment may be controlled by the assistance of the retarding and snowshoe web 7 effects of the webbed ring 8 (FIG. 2a).

The probe instrument package generally includes an intermediate body portion 10, an elongated probe portion 11, and a tail section 12. The body portion 10 of the probe package is adapted to house the electronics components, generally designated 46 in FIGURE 4, and which consist of a shock resistant timer/detonator unit 48, an arming switch 50, a power source such as the battery 52, and ballast. The tail section 12 is adapted to house a positive buoyancy balloon or float 14, an electric cable 16, a first explosive charge 18, a second electric cable 20, a second explosive charge 22, and a third electric cable 24 (FIG. 2b).

The probe portion 11 is dependant from the lower end of the body 10 and is in the form of a long, rigid, hollow shaft 26 of reduced diameter through which runs an electric cable 27 to a bottom explosive charge 28. Shaft 26 is designed to penetrate into the sea bottom sediment in order to position charge 28 and any voids therein may be packed with ballast to assure point first penetration thereof.

In operation, the subject device is adapted to penetrate the sea bottom sediment, as illustrated in FIG. 1. When so positioned, the timer detonator unit 48, suitably in response to pressure or to a predetermined and programmed time delay, emits a first electrical impulse which is sent through the cables 16, 20 and 24 via line 15 to three spring loaded 30 solenoid windings 32 suitably located 120° apart on the outer periphery of float 14 and which are normally biased to latch float 14 within trail section 12 (FIG. 3). Such electrical energization of the solenoid windings causes the iron locking pins 34 serving as the armatures thereof to withdraw from locking holes 36 in the wall of tail section 12 to disengage float 14 from latched engagement therewith. The float 14 then rises sequentially uncoiling cable 16, hoisting the first charge 18, uncoiling the second cable 20, hoisting the second charge 22, and uncoiling the third cable 24 whose lower end enters, and is thereby anchored by a watertight fitting 38 to the upper bulkhead of, compartment 10. When float 14 reaches its upper limit of elevation, the components will be disposed in operating position as shown in FIG. 1.

In accordance with the principles of this invention, any number of charges may be strung out intermediate float 14 and the body portion 10, but, for the purpose of illustration, only three charges will here be considered. As seen in FIG. 1, the first charge 18 is adapted to be suspended in the water sufficiently far removed from the the water/sediment boundary as to be virtually unaffected by its presence. The second charge, 22, is adapted to be detonated close to or on the top of the sea bottom sediment, while the third charge, 28, is adapted to selectively penetrate into the sediments and is there detonated.

At the completion of a predetermined time delay, whose minimum duration must span the time required for charges 18 and 22 to "unpack," a first electrical detonation pulse is sent along line 17 to a detonator cap 19 which is disposed within and detonates the first charge 18. The ensuing explosion is adapted to selectively rupture cable continuity to free float 14. Upon release of the float 14 the second charge 22 falls to the top of the sea bottom sediment, as shown by the dashed line position of cable 24 in FIG. 1. To encourage the second charge 22 to roll away from the tail section 12 during its descent, a set of thin struts 13 may be strung from the top of the tail section to the outer periphery of the webbed ring 8 to engage the charge and direct it away therefrom. Said struts 13 may also serve to brace the webbed ring 8.

At the completion of a third predetermined time delay, whose minimum duration is such as to span the time required for the second charge 22 to fall to the bottom, a second electrical detonation pulse is emitted by the timer unit 48 and is sent via line 21 to a detonator cap 23, which is disposed within and detonates said second charge 22.

Thereafter and at the completion of the fourth predetermined time delay, a third electrical detonation pulse is emitted from the timer 48 and sent via line 25 to detonator cap 29, which in turn detonates the charge 28 disposed in the probe section 11.

As will now be apparent from the foregoing, the subject method functions to provide a sequence or progression of explosive detonations spaced at predeterminable time intervals and at selective locations relative to the water sediment interface.

The material which hereinafter follows is illustrative of a rise of the basic information that is inherently providable by the above described method and apparatus. In operation thereof the resulting explosive waveforms are picked up by a hydrophone 40 of, say, sonobuoy 42 and relayed via radio to receiving/recording equipment aboard the aircraft 2. An underwater explosion generates a waveform similar to that shown in FIG. 5 and the elapsed time between the emission of the main shock wave and the first pressure pulse is referred to as the bubble-pulse period, $T_1$. The first charge 18 may be viewed as a reference charge with its detonation yielding the free-field or unbounded water medium value for the bubble-pulse period $T_1$. The value for $T_1$, for an explosion in an unbounded water medium can be calculated from the formula $T_1 = 4.36 \, z_0^{-1/2}(w/z_0)^{1/3}$; where $z_0$ is hydrostatic depth and $w$ is weight of explosive (D. E. Weston, Proc. Phys. Soc. (London) 76 233 (1960)). However, it can be theoretically shown that this period, $T_1$, should be appreciably increased if a charge, 22, is detonated in proximity to the sea bottom. If the sea bottom is assumed to act as a rigid wall, the new bubble-pulse period, $T_b$, can be calculated from a formula of the form $$T_b = T_1(1 + \bar{a}/4b)$$

where $\bar{a}$ is related to the maximum radius of the gas bubble and $b$ is distance of center of bubble to bottom (R. H. Cole, "Underwater Explosions," Ch. 8, Princeton U Press, Princeton, N.J., (1948)). If the sea bottom is non-rigid, however, this latter formula is no longer valid and a formula sensitive to the properties of the sea bottom must be developed as discussed by D. Epstein, "Influence of Ocean Bottom on Explosion Bubble-Pulse Period," J. Acoust. Soc. Am., vol. 37, p. 1182(A). In cases of extreme porosity, the bottom behaves as a liquid layer of density greater than sea water and the increase in bubble-pulse period is a measure of the density and the porosity. Thus it would appear that comparison of the second charge bubble-pulse period, $T_b$, with the free-field value, $T_1$, should reveal the density and the porosity of the unconsolidated sediments immediately below the sea water.

The third charge 28 is a sub bottom probe; and is designed to explode at a predetermined depth within the upper sedimentary layer. Hydrodynamically, if the high porosity sediments behave as a fluidized layer, a charge fired in this sediment is effectively detonated in a liquid layer of density $\rho = 2.68 - 1.65\phi$; where $\phi$ is the porosity, (Nafe & Drake, "The Sea," ed. M. N. Hill, Interscience Publishers, John Wiley & Sons, New York (1963)). Consequently, the expected bubble-pulse period in the sediment $T_s$, can be obtained from the formula $$T_s = 1.14 \rho_s^{1/2}(Y^{1/3}/P_0^{1/2})P_0^{1/3}$$

where $\rho_s$ is the density of the sediment, considered as a fluid layer, $Y$ is fraction of energy remaining after emission of shock wave, and $P_0$ is the hydrostatic pressure, (Cole, Equ. 8.9, Op. cit.). Since $P_0 = \rho_w g z_0$; where $g$ is the acceleration of gravity and $\rho_w$ is the density of water. Then replacing $P_0$ in the above equation we get $$T_s \overset{\circ}{=} (\rho_s/\rho_w)^{1/2} T_1$$

However, this concept of treating the sediment as a fluid layer is hardly realistic, since even a fluidized layer of, say, 90% porosity, may have a large number of solid particles suspended in it. These particles exert a frictional drag on the moving water from which the permeability of the sediment can be deduced. Thus, any deviations from the fluid layer value, $T_s$, can be interpreted in terms of the permeability; correlation of observed bubble-pulse periods with those obtained from sediments of known composition should yield the permeability. In highly porous sediments the permeability, $k$, the porosity, $\phi$, and the grain size, $d$, are related by the well known formula for porous flow, $$k = d^2/18(1-\phi)$$

(P. C. Carman, "Flow of Gases through Porous Media," Academic Press (1960)). It is noted that this formula permits the calculation of the grain size, if the permeability and porosity are known. Furthermore, since the basic types of bottom sediments, namely, sand, silt, and clay, have characteristic grain sizes, differing by orders of magnitude, the type of sediment can be inferred as well.

From the above discussion it is seen that the subject probe instrument package basically generates three different categories of bubble-pulse periods: (a) from the first charge 18, the free-field reference period $T_1$ is obtained; (b) from the second charge 22 that is detonated near the bottom, $T_b$ is obtained; and (c) from the third charge 28 detonated within the sea bed, $T_s$ is obtained. Furthermore, for the purposes of distinguishing the different types of bubble-pulse periods generated, it has been shown that $T_1$ depends almost entirely on the water parameters, while $T_b$ depends on both the water parameters and the sea bottom properties; $T_s$ is essentially a function of the sediment characteristics. Consequently, the measured differences amongst $T_l$, $T_b$, and $T_s$, can be used to determine the sea bottom properties.

Having described the invention in connection with certain embodiments thereof, it will now be understood that further modifications will suggest themselves to those skilled in the art and it is intended to cover such modifications as fall within the scope of the appended claims.

What is claimed is:

1. In the determination of the geophysical properties of localized sea bottom areas by observation of sediment flow behavior patterns, the steps of
   positioning a first explosive charge at a predetermined location and at a selected distance above the sea bottom,
   positioning a second explosive charge generally beneath said first explosive charge and on said sea bottom and
   positioning a third explosive charge generally beneath said second explosive charge and at a selected distance beneath said sea bottom and
   sequentially detonating said first, second and third charges in predetermined order and at spaced time intervals of sufficient duration to permit discrete recordation of the bubble-pulse characteristics of each such detonation.

2. The method as set forth in claim 1 including the steps of recording the comparative bubble-pulse signals resulting from the detonation of said charges.

3. In the determination of the in situ geophysical properties of localized sea bottom sediment areas by observation of sediment flow behavior patterns, the steps of
   detonating a first explosive charge disposed a predetermined distance above the water-sediment interface to produce a bubble-pulse period essentially selectively dependent on the local water parameters,
   detonating a second explosive charge closely adjacent to the water-sediment interface after a predetermined time interval to produce a second bubble-pulse period conjointly dependent upon the local water parameters and the local sea bottom sediment properties, and
   detonating a third explosive charge disposed a predetermined distance below the water-sediment interface after a second predetermined time interval to produce a third bubble-pulse period essentially selectively dependent upon the local sea bottom sediment parameters.

4. A probe device for use in ascertaining the geophysical properties of localized sea bottom sediment areas comprising,
   a body portion,
   an elongated probe portion dependent from said body portion adapted for embedment within the upper sediment layers of the sea bottom and containing an explosive charge therein,
   means associated with said body portion adapted to contain a float interconnected in spaced relation with second and third explosive charges,
   means for selectively effecting the relase of said float and said second and third charges subsequent to embedment of said probe portion with said sea bottom sediment to permit elevated disposition of said second and third charges above said body portion spaced apart a sufficient distance to permit selective detonation of the uppermost and third charge without effecting sympathetic detonation of the second and lower charge disposed therebeneath, and
   means for effecting the selective detonation of the charge disposed adjacent to said float to sever the interconnection between said second and third charges and to permit the unexploded charge thereof to descend to the water-sediment interface.

5. The device as set forth in claim 4 including means for effecting the selective detonation of the explosive charges disposed on and below said water-sediment interface.

6. The device as set forth in claim 4 including means for effecting the sequential detonation of said third, second and first charges at predetermined time intervals sufficient to permit discrete recordation of the bubble-pulse characteristics of each such detonation.

References Cited

UNITED STATES PATENTS

| 2,599,245 | 6/1952 | Finn | 181—.5 |
| 2,619,186 | 11/1952 | Carlisle | 181—.5 |
| 2,631,819 | 3/1953 | Duncan | 102—13 X |
| 2,691,939 | 10/1954 | Hintze | 102—23 |

BENJAMIN A. BORCHELT, *Primary Examiner.*

SAMUEL FEINBERG, *Examiner.*

P. A. SHANLEY, R. M. SKOLNIK, *Assistant Examiners.*